UNITED STATES PATENT OFFICE.

CARL IMMERHEISER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF MAKING RED LAKES.

No. 872,181.　　　Specification of Letters Patent.　　　Patented Nov. 26, 1907.

Application filed July 10, 1906. Serial No. 325,527.

*To all whom it may concern:*

Be it known that I, CARL IMMERHEISER, doctor of philosophy and chemist, subject of the King of Bavaria, residing at Ludwigshafen-on-the-Rhine, in the Kingdom of Bavaria, German Empire, have invented new and useful Improvements in the Production of Red Color-Lakes, of which the following is a specification.

In the specifications of Letters Patent Nos. 650,757 and 690,294 is described the production of coloring matter lakes from the azo coloring matter 1-naphthalene-sulfoacid-2-azo-betanaphthol (known on the market as "lithol red") and from similar coloring matters, and it is there stated that the metallic lakes can be obtained by partly dissolving and partly suspending in water a salt of the dyestuff, or the free acid itself, and then treating this solution, or mixture, with a soluble metallic salt, or a metallic hydroxid.

I have now discovered that the objects of the process described in the aforesaid specifications can be advantageously attained by grinding the coloring matter (either in the form of the free acid, or of a salt thereof) and the metallic compound together, adding only such a small quantity of water, or other suitable liquid (such for instance as alcohol) that the resulting product is practically dry and the operations of filtering and drying the lake as required in the former process are rendered unnecessary. A substratum can be, and preferably is, added to, and ground with, the other materials. The water, or other suitable liquid, may be added all at once, or gradually, and, if desired, the metallic salt and the water, or other suitable liquid can be added together in the form of a saturated, or concentrated solution. The reaction is completed within a short time, usually between one (1) and two (2) hours. The exact quantity of water that can be employed varies according to conditions observed in grinding. It is preferred under ordinary circumstances to use about four per cent. of water upon the entire quantity of material ground. More than ten per cent. cannot be used as it results in the formation of a paste when grinding and yields unsatisfactory results.

The following examples will serve to further illustrate how my invention can be performed, but it is not limited to these examples. The parts are by weight.

Example 1. Grind together, in an edge runner, one hundred (100) parts of heavy spar and five (5) parts of "lithol red" in powder and, while grinding, spray onto the mass a solution of two and three-fifths (2.6) parts of barium chlorid in about seven (7) parts of water and then continue the grinding for from one (1), to two (2), hours. At the end of this time the formation of the barium lake is completed and the lake is ready for use. Instead of water in this example, the equivalent quantity of alcohol, or other suitable liquid, may be employed.

Example 2. Grind together, while dry, five thousand (5,000) parts of heavy spar, three hundred (300) parts of 1-naphthalene-sulfo-acid-2-azo-betanaphthol, and eighty-five (85) parts of chalk, then spray onto the mixture two hundred (200) parts of water and continue grinding for a short time. In this example instead of chalk, other carbonates, or metallic oxids, or hydroxids, can be employed.

Now what I claim is:

1. The process for the production of red color lakes by grinding together a hereinbefore defined coloring matter, a metallic compound and less than ten per cent. (10%) of water, or other suitable liquid, that the resulting product is practically dry.

2. The process for the production of red color lakes by grinding together a hereinbefore defined coloring matter, a substratum, a metallic compound and less than ten per cent. (10%) of water, or other suitable liquid, that the resulting product is practically dry.

In testimony whereof I have hereunto set my hand in the presence of two subscribing witnesses.

CARL IMMERHEISER.

Witnesses:
ERNEST F. EHRHARDT,
J. ALEC. LLOYD.